Figure 1:
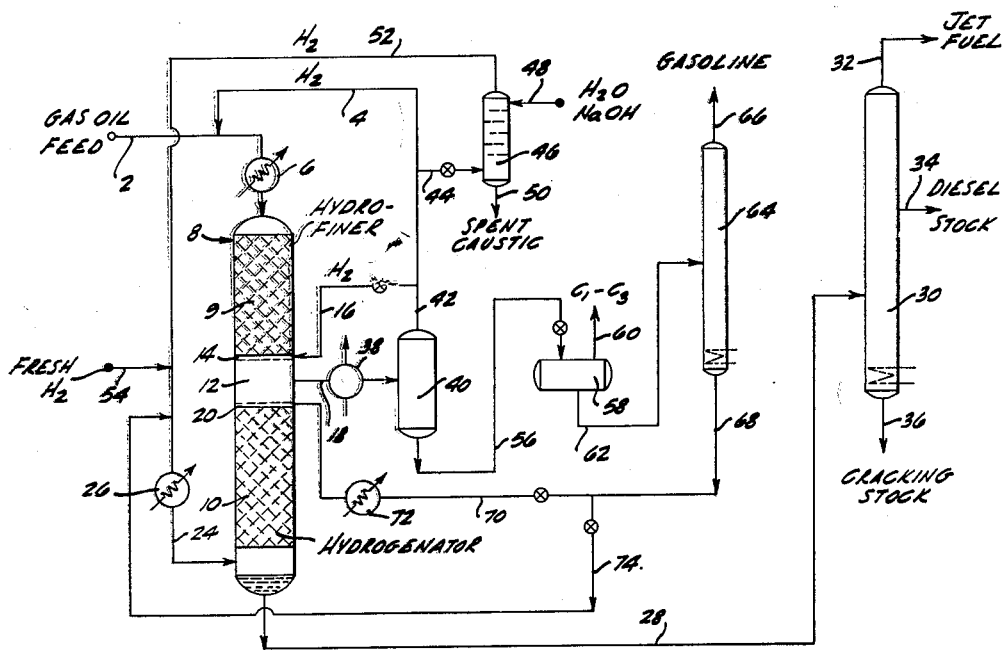

Sept. 1, 1964

R. H. HASS ETAL 3,147,210

TWO STAGE HYDROGENATION PROCESS

Filed March 19, 1962

2 Sheets-Sheet 1

INVENTORS.
ROBERT H. HASS,
CLOYD P. REEG,
FRANK C. RIDDICK JR.,
BY
Lannas S. Henderson

ATTORNEY.

INVENTORS.
ROBERT H. HASS,
CLOYD P. REEG,
FRANK C. RIDDICK,

BY
Lannas S. Henderson

ATTORNEY

United States Patent Office 3,147,210
Patented Sept. 1, 1964

3,147,210
TWO STAGE HYDROGENATION PROCESS
Robert H. Hass, Fullerton, Cloyd P. Reeg, Orange, and
Frank C. Riddick, Jr., Long Beach, Calif., assignors to
Union Oil Company of California, Los Angeles, Calif.,
a corporation of California
Filed Mar. 19, 1962, Ser. No. 180,700
16 Claims. (Cl. 208—210)

This invention relates to the catalytic hydrogenation of high-boiling aromatic hydrocarbons to produce saturated hydrocarbons, boiling for example in the diesel or jet fuel range. More specifically, the invention is concerned with the hydrogenation of sulfur-containing aromatic mineral oils. In broad aspect, the invention embraces an integrated hydrofining-hydrogenation process wherein the initial feedstock is first subjected to catalytic hydrofining, preferably in concurrent flow with hydrogen, and is then subjected to low-temperature hydrogenation over a sulfur-sensitive noble metal hydrogenation catalyst, with the hydrofined liquid feed flowing countercurrently to a hydrogen stream. By operating in this manner, important economies are achieved by way of improving hydrogenation efficiency and reducing the quantity of hydrofining catalyst required for a given feed throughput.

In one of its preferred modifications, the invention comprises the following steps: (1) the initial feedstock is subjected to an incomplete catalytic hydrofining in concurrent flow with added hydrogen under conditions such that the organic sulfur content is reduced to a level sufficient to provide a sulfur/hydrogen input ratio in the subsequent countercurrent hydrogenation step (3) of between about 1 and 80 gms. per 1,000 s.c.f.; (2) the liquid phase hydrofining effluent is stripped of dissolved hydrogen sulfide; (3) the stripped liquid phase, still containing organic sulfur in the stated proportions, is then subjected to catalytic hydrogenation over a Group VIII noble metal hydrogenation catalyst in countercurrent flow with hydrogen, and at relatively low temperatures, to produce an overhead vapor phase comprising a small proportion of light hydrocarbons (e.g., gasoline) and a desired hydrogenated liquid phase bottoms product; (4) the vapor phase effluent from the countercurrent hydrogenation step is cooled and condensed to recover recycle hydrogen and an incompletely hydrogenated liquid condensate; (5) the liquid condensate is fractionated to remove light ends (e.g., gasoline), and the remaining intermediate-boiling-range oil is subjected to further hydrogenation by recycle to the countercurrent hydrogenation zone, where it may be introduced either with the upflowing hydrogen stream or with the downflowing liquid feed, or at some intermediate point.

According to a preferred embodiment of the invention, the initial hydrofining step is "integral" with the countercurrent hydrogenation step, i.e., there is no substantial depressuring and repressuring, or cooling and reheating of the liquid phase hydrofiner effluent before it is subjected to the countercurrent hydrogenation. It is also preferred to operate the countercurrent hydrogenation step at a temperature which is substantially lower than the temperature of the initial hydrofining step. A requirement of the process is that the hydrogen stream used in the countercurrent hydrogenation step must be substantially free of hydrogen sulfide. To meet these requirements, the invention also embraces certain novel and advantageous methods for providing a substantially pure hydrogen stream for the countercurrent hydrogenation.

As may be apparent from the foregoing, the invention centers mainly about the problem of how to hydrogenate most economically aromatic feedstocks which contain organic sulfur compounds. As is well known, sulfur compounds adversely affect the hydrogenation activity of Group VIII noble metal hydrogenation catalysts. To overcome this difficulty, the feedstock is often subjected to a preliminary catalytic hydrofining treatment over sulfactive hydrofining catalysts in order to decompose the sulfur compounds, and the hydrofined product is condensed and washed to remove hydrogen sulfide. The remaining sulfur-free hydrocarbons are then subjected to hydrogenation. One of the principal objections to this hydrofining pretreatment is that the facilities required for condensing, washing, reheating and repressuring the hydrofiner effluent are very expensive. A partial solution to the expense involved in such separate, or non-integral, hydrofining treatments has been proposed (cf. U.S. Patent No. 2,671,754), and consists essentially in conducting the hydrofining with countercurrent flow of oil and hydrogen, so as to strip out hydrogen sulfide as it is formed. This solution however is feasible only for very high-boiling feedstocks, for if the feed contains substantial proportions of components boiling below about 700° F., a large proportion thereof will be in the vapor phase at the high temperatures and low pressures required for efficient and economical hydrofining. This results in an inefficient countercurrent operation, with a large portion of the feed being vaporized and removed before desulfurization is complete.

Another major economic drawback in hydrofining pretreatments involves the substantial investment in hydrofining catalyst and hydrofining reactor space which is required if the sulfur content of the feed is to be reduced to below about 10 parts per million, which is normally required for the efficient utilization of noble metal hydrogenation catalysts in conventional concurrent flow contacting. Due to the kinetics involved in the desulfurization reaction, there is a logarithmic relation between liquid hourly space velocity and the degree of completion of the desulfurization, which relation can be expressed as follows:

$$\frac{1}{LHSV} = C \log \left(\frac{S_f}{S_p}\right)$$

where $C$ is a constant depending upon catalyst activity and reaction conditions, LHSV is liquid hourly space velocity, $S_f$ is percent sulfur in the feed, and $S_p$ is percent sulfur in the product. From this relationship it can be calculated that if a given catalyst used under a given set of conditions will reduce the sulfur content of a feedstock from 1,000 parts per million to 100 parts per million at 1.0 space velocity, a space velocity of 0.5 will be required to give a product containing only 10 parts per million of sulfur. This means that, where only one volume of catalyst is required to remove the first 900 parts per million of sulfur, another equal volume of catalyst will be required to take out the next 90 parts of sulfur. Thus, it is obvious that catalytic hydrofining becomes a fairly expensive operation when it is required that the sulfur content of the feed be reduced to below about 10 parts per million, as is generally required in conventional hydrogenation processes utilizing Group VIII noble metal catalysts.

The poisoning effect of sulfur compounds upon the hydrogenation activity of Group VIII noble metal catalysts is apparently due at least in part to the chemical conversion of the free metal to a sulfide form. It has now been discovered however that the hydrogenation activity of noble metal catalysts is remarkably sensitive to the sulfur/hydrogen ratio in the hydrogenation zone, reflecting apparently a reversible reaction such as:

$$Pt + H_2S \rightleftarrows PtS + H_2$$

Further, it has been found that, under conditions of countercurrent flow of hydrogen and oil through the catalyst bed, effective hydrogenation of aromatics can be achieved at much higher feed sulfur concentrations than can be tolerated under conditions of concurrent flow. This sulfur-tolerance under conditions of countercurrent flow is not displayed in the same order of magnitude by other hydrogenation catalysts such as nickel. Consequently, in using Group VIII noble metal catalysts, it is found that effective hydrogenation can be maintained in countercurrent contacting if the sulfur/hydrogen input ratio to the noble metal hydrogenation zone falls within the range of about 1 to 80, and preferably about 5 to 50, grams of sulfur per 1,000 s.c.f. of hydrogen. And this effect is obtained moreover without materially increasing the catalyst/oil ratio (i.e., without materially decreasing the liquid hourly space velocity) over what would be required to effect the same hydrogenation of a sulfur-free feed by concurrent flow contacting.

The particular significance of the foregoing is that, for a given feed throughput and conversion, the size of the hydrofining pretreater, and the quantity of hydrofining catalyst, can be materially reduced without sacrificing catalyst efficiency in the noble metal hydrogenation step. In countercurrent operation, the hydrogenation catalyst in the upper portion of the bed appears to complete the decomposition of remaining sulfur compounds, and the equilibrium gradient of the metal/metal sulfide ratio brought about by the countercurrently flowing hydrogen is such that the hydrogen sulfide formed can be continuously swept out of the reactor, leaving the major lower portion of the catalyst bed substantially sulfur-free. This desirable result is not achieved to the same extent when the sulfur/hydrogen input ratio is greater than about 80 gms. per 1,000 s.c.f., apparently because a prohibitively large portion of bed becomes sulfided.

From the foregoing it will appear that one objective of the invention is to obtain the essential benefits of prehydrofining without the normally accruing disadvantage of the expensive condensation, washing, reheating and repressuring facilities required for separate, or non-integral hydrofining. A more specific object is to reduce the overall reactor space and catalyst required for the catalytic hydrofining of aromatic hydrogenation feeds. Another objective is to provide a low temperature hydrogenation process which can tolerate maximum amounts of sulfur compounds. Other objectives will be apparent from the more detailed description which follows.

Figure 2:
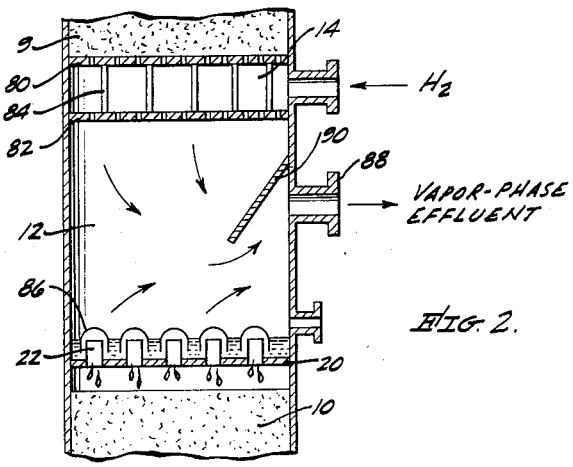
Figure 3:
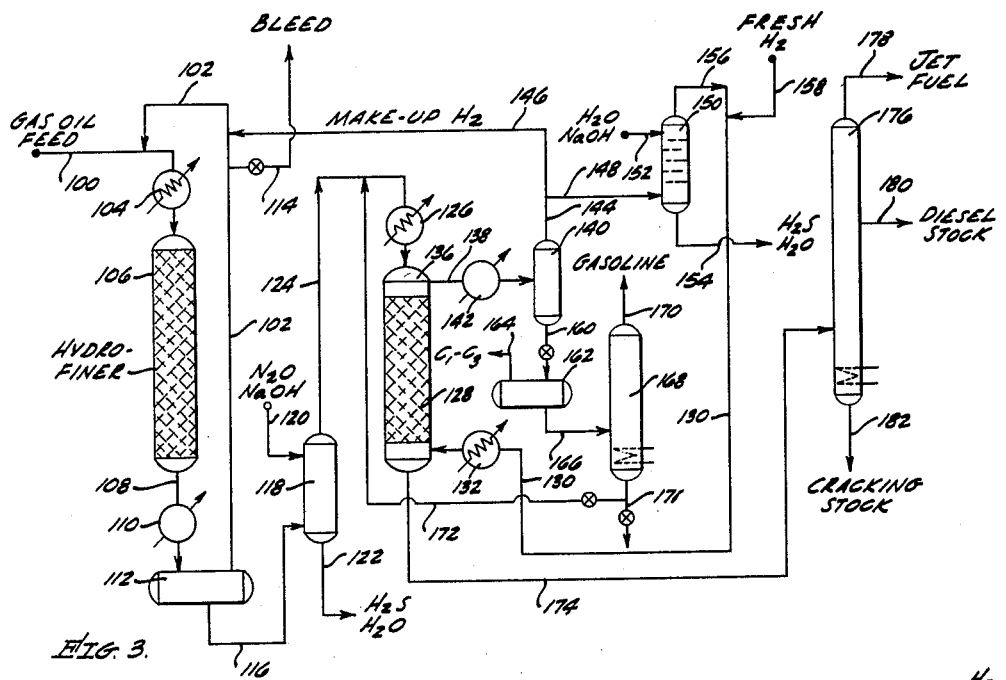
Figure 4:
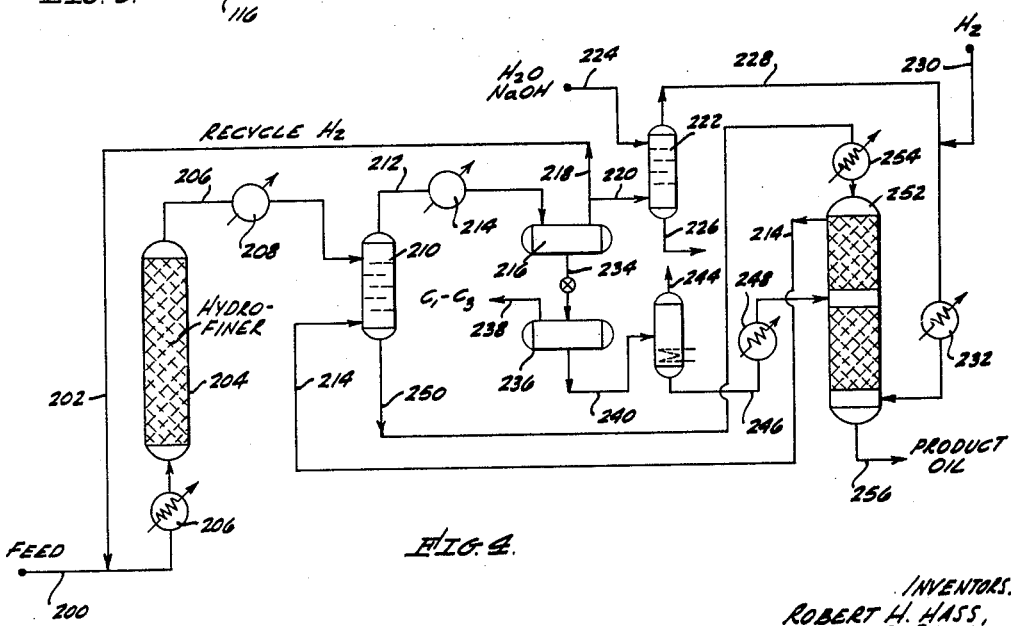

The invention may perhaps be more readily understood with reference to the accompanying drawings. FIGURE 1 is a flowsheet illustrating the invention in one of its preferred forms, embracing an "integral" hydrofining-hydrogenation operation. FIGURE 2 is a detailed vertical cross-sectional illustration of the quench-gas engaging and vapor phase disengaging section of reactor 8 in FIGURE 1. FIGURE 3 is a flowsheet illustrating another modification of the invention utilizing separate or nonintegral hydrofining and hydrogenation. FIGURE 4 is a flowsheet illustrating a modified version of the process of FIGURE 1, with concurrent upflow in the hydrofiner. In the succeeding description, it will be understood that the drawings have been simplified by the omission of certain conventional elements such as valves, pumps, compressors and the like. The heating and cooling units indicated are merely symbolic, and in actual practice many of these would be combined into banks of heat exchangers and fired heaters, according to standard engineering practice.

Referring more particularly to FIGURE 1, the initial feedstock is brought in via line 2, mixed with recycle hydrogen from line 4, preheated to incipient hydrofining temperature in heater 6, and then passed directly into the top of dual-bed reactor 8 via preheater 6. Reactor 8 comprises an upper bed of hydrofining catalyst 9, a lower bed of noble metal hydrogenation catalyst 10, and an intervening vapor disengaging space 12, the latter being shown in greater detail in FIGURE 2. Hydrofining proceeds in upper catalyst bed 9 under substantially conventional conditions. Suitable hydrofining catalysts include for example mixtures of the oxides and/or sulfides of cobalt and molybdenum, or of nickel and tungsten, preferably supported on a carrier such as alumina, or alumina containing a small amount of coprecipitated silica gel. Other suitable catalysts include in general the oxides and/or sulfides of the Group VIB and/or Group VIII metals, preferably supported on substantially non-cracking, adsorbent oxide carriers such as alumina, silica, titania, and the like. The hydrofining operation may be conducted either adiabatically or isothermally, and under the following general conditions:

HYDROFINING CONDITIONS

| | Operative | Preferred |
|---|---|---|
| Temperature, ° F. (avg. bed) | 600–850 | 650–825 |
| Pressure, p.s.i.g | 200–3,000 | 400–2,000 |
| LHSV, v./v./hr. | 0.3–10 | 1–5 |
| $H_2$/oil ratio, s.c.f./b | 200–12,000 | 1,000–8,000 |

The above conditions are suitably adjusted so as to reduce the sulfur content of the feed to levels as above prescribed.

The total hydrofining effluent from bed 9 passes into a quench-gas engaging and mixing section 14, into which relatively cool recycle hydrogen is injected via line 16, to cool the effluent to approximately the desired hydrogenation temperature. The cooling also effects some additional condensation of liquid hydrocarbons. The mixed-phase effluent then emerges into vapor disengaging space 12, the vapor phase being withdrawn via line 18, and the liquid phase accumulating on bubble-cap tray 20. On bubble-cap tray 20 (or a plurality of such trays), stripping of the liquid phase hydrofiner effluent takes place by virtue of rising vapor phase effluent from hydrogenation catalyst bed 10, which passes upwardly through vapor risers 22 (FIGURE 2), the stripped liquid phase overflowing downwardly through said vapor risers and thus being distributed onto the top of hydrogenation catalyst bed 10. It will thus be apparent that the vapor phase withdrawn via line 18 comprises the combined vapor phase effluent from hydrofining bed 9 and hydrogenation catalyst bed 10, as well as substantially all of the hydrogen sulfide formed during hydrofining.

The stripped liquid phase hydrofiner effluent, now substantially free of hydrogen sulfide as it falls on catalyst bed 10, percolates downwardly therein, countercurrently to a rising stream of hydrogen admitted via line 24 and hydrogen preheater 26. The resulting hydrogenated product accumulates in the bottom of the reactor, and is withdrawn via line 28 and sent to a product fractionation column 30, where it is separated into desired products such as a jet fuel overhead via line 32, a diesel fuel side-cut via line 34, and a bottoms fraction via line 36 which may be utilized as a cracking charge stock.

The process conditions in hydrogenation bed 10 are suitably adjusted so as to provide the desired degree of hydrogenation of the aromatic hydrocarbons in the feed, while at the same time maintaining the major portion, e.g., at least about 80%, of the feed in the liquid phase. For these purposes, it will be understood that pressures in the high range will be used in conjunction with temperatures in the high range, while the lower operative pressures will normally be used in conjunction with the lower temperatures. The range of operative conditions contemplated in hydrogenation bed 10 are as follows:

COUNTERCURRENT HYDROGENATION CONDITIONS

|  | Operative | Preferred |
|---|---|---|
| Temperature, ° F. (avg. bed) | 350–650 | 450–600 |
| Pressure, p.s.i.g. | 200–3,000 | 400–2,000 |
| LHSV, v./v./hr. | 0.3–10 | 0.7–5 |
| $H_2$/oil ratio, s.c.f./b. | 200–12,000 | 1,000–10,000 |

Those skilled in the art will readily understand that when ranges of operating conditions are specified as above, a large number of determinative factors are involved. Thus, highly active catalysts, or fresh catalysts at the beginning of a run, will be used in conjunction with lower temperatures than will less active or partially deactivated catalysts. It will be understood also that the specified hydrogen/oil ratios must necessarily be further adjusted and controlled within the stated ranges so as to maintain the previously specified sulfur/hydrogen input ratio of 1–80 gms. per 1,000 s.c.f. of hydrogen. The lower limit of pressure to be utilized in a given operation will normally depend upon the desired run length. Lower pressures generally result in a more rapid deactivation of the catalyst, and hence where extremely long run lengths are desired, pressures of about 1,000 p.s.i.g. are mandatory. However, economically feasible run lengths are normally obtainable with most catalysts and feedstock within the 600–2000 p.s.i.g. pressure range.

In hydrogenation bed 10, the rising hydrogen stream continuously sweeps out of the reactor small amounts of low boiling hydrocarbons and hydrogen sulfide as it is formed therein, the resulting vapor phase being withdrawn via line 18, in admixture with the uncondensed vapor phase from hydrofining bed 9. This mixed vapor phase effluent in line 18 is transferred via cooler 38, at a temperature of about 50–200° F., to high pressure separator 40, from which impure recycle hydrogen is withdrawn via line 42. A portion of this recycle hydrogen requires no purification and is hence recycled directly to the top of hydrofining catalyst bed 9 via line 4. Another portion of this recycle gas, likewise requiring no purification, is to be used as a quench gas, and is hence diverted to quench zone 14 via line 16 as previously described. However, the portion of recycle hydrogen to be used in hydrogenation bed 10 requires purification and is hence diverted via line 44 to a scrubbing column 46 where it passes upwardly, countercurrently to a descending stream of aqueous caustic admitted via line 48. Spent caustic containing dissolved sodium sulfides and ammonia is withdrawn via line 50. Purified hydrogen is taken overhead via line 52 and recycled to the bottom of hydrogenation catalyst bed 10, as previously described. In order to reduce to a minimum the amount of hydrogen which must be subjected to the scrubbing operation, it is preferred to admit the whole of the makeup hydrogen required in both catalyst beds to recycle line 52 via line 54.

The liquid hydrocarbon condensate in separator 40 is depressured via line 56 into low pressure separator 58, from which light hydrocarbon gases are exhausted via line 60. The remaining liquid phase is then transferred via line 62 to fractionating column 64, from which a small gasoline fraction (derived mainly from the decomposition of organic sulfur and nitrogen compounds in hydrofining bed 9) is taken overhead via line 66. The bottoms fraction from the column (in line 68) comprises an intermediate-boiling-range light gas oil which in many cases is incompletely hydrogenated because most of it did not completely traverse hydrogenation catalyst bed 10, but was vaporized in the top portion thereof and swept upwardly and out. To complete the hydrogenation of this fraction it may if desired be recycled to the top of hydrogenation bed 10 via line 70 and preheater 72. However, in a preferred modification, this light recycle oil is diverted via line 74 to hydrogen recycle line 52, and the mixture of hydrogen and oil (substantially all in vapor phase) is admitted to the bottom of reactor 8 via preheater 26 and line 24. By operating in this manner, all of the light recycle oil must pass through the catalyst bed, and is not flashed directly off into line 18, as may tend to occur when it is recycled via line 70.

Reference is now made to FIGURE 2 for a more detailed illustration of suitable apparatus making up hydrogen quench zone 14 and vapor disengaging zone 12 of FIGURE 1. Hydrogen quench zone 14 is defined by an upper perforated plate 80, supporting catalyst bed 9, and a lower perforated plate 82 spaced a short distance below plate 80. Preferably, quench gas engaging zone 14 is interspersed with a plurality of vertical bars or baffles 84 in order to provide efficient mixing of the incoming quench hydrogen with the hydrofiner effluent from catalyst bed 9. Liquid and vapor phase effluent from catalyst bed 9 passes into quench zone 14 through the perforations in upper plate 80, is mixed therein with cool hydrogen, and the mixture then emerges through lower perforated plate 82 into vapor phase disengaging zone 12, where phase separation takes place. The liquid phase portion of hydrofiner effluent falls onto bubble cap tray 20, and overflows through vapor risers 22 onto lower hydrogenation catalyst bed 10, as previously described. Upflowing vapor phase from hydrogenation catalyst bed 10 travels upwardly through risers 22 and around the lower edges of bubble caps 86, thereby effecting a stripping of the liquid on tray 20. The combined vapor phase effluent from hydrofining bed 9 and vapor phase effluent from lower catalyst bed 10 is withdrawn through nozzle 88. A sloping baffle plate 90 may be provided above the nozzle outlet in order to minimize the entrainment of liquid in the vapor phase being withdrawn.

Referring now to FIGURE 3, illustrating separate or non-integral hydrofining and hydrogenation the initial feedstock is brought in via line 100, mixed with recycle hydrogen from line 102, and passed via preheater 104 into the top of catalytic hydrofiner 106, where hydrofining proceeds as previously described in connection with FIGURE 1. The total hydrofiner effluent is withdrawn via line 108, cooled to, e.g., 50–200° F. in heat exchanger 110, and transferred to high pressure separator 112, from which impure hydrogen is withdrawn and recycled via line 102. In order to prevent the buildup of light hydrocarbons in this recycle gas, a small bleed stream may be withdrawn via line 114. The liquid condensate in separator 112 is transferred via line 116 to a scrubbing vessel 118 where it is scrubbed with aqueous caustic admitted via line 120, the spent caustic being withdrawn via line 122. Washing takes place in vessel 118 at the autogenous pressure developed by dissolved $C_1$–$C_3$ hydrocarbons in the liquid condensate, thus avoiding the necessity of a complete depressuring of the liquid product, and repressuring thereof for the subsequent hydrogenation step. If desired, however, the liquid condensate in line 116 can be passed through an intervening low pressure separator wherein light gases are removed, thus permitting atmospheric pressure scrubbing in vessel 118. In either case, the washed liquid condensate, now substantially free of dissolved hydrogen sulfide, is transferred via line 124 and preheater 126 to the top of countercurrent hydrogenation reactor 128.

In hydrogenation unit 128, hydrogenation of the liquid feed takes place under conditions substantially the same as those described in connection with hydrogenation bed 10 of FIGURE 1. Preheated hydrogen is admitted at the bottom of the reactor via line 130 and preheater 132, and passes upwardly, countercurrently to the descending liquid feed. The rising vapor phase emerges into the top of the reactor and mingles with the vapor phase formed by the re-heating of the hydrofined liquid feed. It will be understood that the mixed-phase feed entering the top of reactor 128 separates in vapor disengaging space 136, the combined vapors being withdrawn via line 138. The vapor phase in line 138 comprises light hydrocarbons from hydrofiner 106 as well as some light hydrocarbons and hydrogen sulfide formed in the lower portion of reactor 128. This vapor phase is then condensed and passed into high pressure separator 140 via condenser 142. Recycle gas containing a small amount of hydrogen sulfide is withdrawn via line 144, and a portion thereof is passed directly to reactor 106 via lines 146 and 102, comprising the total makeup hydrogen required in reactor 106. The remaining recycle gas is diverted via line 148 to scrubbing column 150 where it is scrubbed with aqueous caustic admitted via line 152 and withdrawn via line 154. The scrubbed recycle gas is taken overhead via line 156, blended with fresh make-up hydrogen from line 158, and the mixture is then recycled to the bottom of reactor 128 via line 130 as previously described.

The liquid condensate in separator 140 is flashed via line 160 into low pressure separator 162, from which flash gases are exhausted via line 164. The remaining liquid condensate is then transferred via line 166 to fractionating column 168, from which a small gasoline fraction is taken overhead via line 170, and a light gas oil is recovered as bottoms via line 171. This light gas oil, normally being incompletely hydrogenated, may be recycled to the top of reactor 128 via line 172, or it may be recycled, substantially in vapor phase, in admixture with the hydrogen in line 130 to the bottom of the reactor.

The hydrogenated liquid product accumulating in the bottom of reactor 128 is withdrawn via line 174 and transferred to fractionating column 176 for recovery of the desired product fractions. In the case illustrated, a 350–510° F. jet fuel fraction is recovered as overhead via line 178, a diesel stock boiling between about 500° and 620° F. via line 180, and 620° F.+ bottoms fraction via line 182 for use as cracking stock.

Referring now to FIGURE 4, the initial feedstock is brought in via line 200, mixed with recycle hydrogen from line 202, and the mixture is then passed into the bottom of hydrofiner 204 via preheater 206. Hydrofining takes place in reactor 204 under the same general conditions described in connection with hydrofining reactor 9 of FIGURE 1, but with concurrent upflow of hydrogen and feed. Concurrent upflow in many instances provides a more efficient hydrofining operation by virtue of the increased turbulence and more efficient contacting of the catalyst. Moreover, the residence time of the liquid phase portion of feed is increased relative to that of the vapor phase portion. This is normally desirable because the more refractory sulfur compounds are concentrated in the heavy portion of feed.

The combined hydrofiner effluent is withdrawn via line 206, cooled to approximately the desired hydrogenation temperature in heat exchanger 208, and then transferred to high pressure stripping vessel 210. Phase separation takes place in the top of vessel 210, with the vapor phase going overhead via line 212, and the liquid phase passing downwardly over a series of stripping trays or packing material, countercurrently to a rising stream of hot vapor phase effluent from the subsequent hydrogenation step, the latter being admitted at the bottom of vessel 210 via line 214. In this manner, hydrogen sulfide formed in hydrofiner 204 is stripped from the liquid product, and the combined vapor phase effluents from hydrofiner 204 and hydrogenation reactor 252 are taken overhead via line 212.

The mixed vapor phase effluent in line 212 is then cooled to, e.g., 50–200° F. in heat exchanger 214 and passed into high pressure separator 216, from which impure recycle gas is withdrawn via line 218, a portion thereof being directly recycled via line 202 to reactor 204 as previously described. The portion of recycle gas to be used in hydrogenation reactor 252 is diverted via line 220 to a scrubbing column 222 where it is scrubbed with aqueous caustic admitted via line 224, spent caustic being withdrawn via line 226. The scrubbed recycle gas, essentially free of hydrogen sulfide, is then taken overhead via line 228, mixed with fresh make up hydrogen for both reactors from line 230, and passed via preheater 232 into the bottom of hydrogenation reactor 252.

The liquid condensate in high pressure separator 216 is flashed via line 234 into low pressure separator 236, from which $C_1$–$C_3$ dry gases are exhausted via line 238. The remaining liquid condensate in vessel 236 is transferred via line 240 to fractionating column 242 wherein gasoline vapors are distilled overhead via line 244, while the light gas oil bottoms fraction is transferred via line 246 and preheater 248 to the midsection of hydrogenation reactor 252. Admitting the partially hydrogenated light gas oil to the midsection of the reactor is an alternative to the modes of operation illustrated in FIGURES 1 and 3, and is advantageous in that whatever portion of the oil is vaporized will still contact a considerable portion of catalyst upwardly in the reactor, and any remaining unvaporized liquid oil will contact the lower portion of catalyst.

The principal feedstock to hydrogenation reactor 252 is derived from stripping vessel 210, being removed therefrom via line 250 and transferred to the top of reactor 252 via preheater 254. It will be apparent that the contacting in reactor 252 is countercurrent throughout, with the liquid feed passing downwardly, and hydrogen and light hydrocarbons upwardly, the total vapor phase product being separated at the top of the reactor and withdrawn via line 214 for use in stripping vessel 210 as previously described. The liquid phase product accumulates in the bottom of the reactor and is withdrawn via line 256 and sent to suitable fractionating equipment to recover the desired hydrogenated products.

The hydrogenation catalysts to be used herein comprise a minor proportion, e.g., about 0.1% to 3% by weight, of one or more of the Group VIII noble metals, i.e., ruthenium, rhodium, palladium, osmium, iridium and platinum. This active hydrogenation component is distended and supported as by impregnation, upon an adsorbent, high-surface-area carrier such as activated alumina, charcoal, silica gel, titania, zirconia, magnesia, or the like. Catalysts of this nature are conventional, and hence need not be described in detail. The preferred catalysts are composed of about 0.5% to 2% by weight of platinum and/or palladium, supported upon an activated alumina having a surface area of about 50–300 square meters per gram. Where it is desired to minimize cracking, the carrier should display a minimum of surface acidity, such as that displayed by mixed carriers comprising silica and one or more other components such as alumina, zirconia or magnesia.

However, the term "hydrogenation" as used herein, is intended to be generic to non-cracking hydrogenation and to hydrogenation with concurrent cracking, or "hydrocracking." Where hydrocracking is desired, the preferred carriers are of the acidic type such as silica-alumina, silica-magnesia, silica-zirconia, alumina-boria, silica-titania, silica-zirconia-titania, acid treated clays and the like. Acidic metal phosphates such as aluminum phosphate may also be used. The preferred cracking bases comprise composites of silica and alumina containing about 50–90% silica; coprecipitated composites of silica, titania, and zirconia containing between 5% and 75% of each component; partially dehydrated, zeolitic, crystalline molecular sieves, e.g., of the "X" or "Y" crystal types, having relatively uniform pore diameters of about 8 to 14 angstroms, and comprising silica, alumina and one or more exchangeable zeolitic cations. Any of these cracking bases may be further promoted by the addition of small amounts, e.g., 1% to 10% by weight, of halogen or halides such as fluorine, boron trifluoride or silicon tetrafluoride.

When using the foregoing hydrocracking catalysts, hydrocracking is obtained under the same general conditions previously specified for hydrogenation, with the exception that temperatures about 50–100° F. higher, and pressures above 500 p.s.i.g., are generally preferred.

The feedstocks which may be treated herein include in general any mineral oil fraction having an initial boiling point above the conventional gasoline range, i.e., above about 350° F., and having an end-boiling-point of up to about 1,000° F. This includes straight-run gas-oils, coker distillate gas oils, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 350° and 700° F., having an API gravity of 25° to 40°, containing at least about 10% by volume of aromatic hydrocarbons and at least about 20% by volume of hydrocarbons boiling above 600° F. It is further preferred, for maximum efficiency in countercurrent contacting, that the feed contain less than about 20% by volume of components boiling below 400° F. Such oils may also contain from about 0.1% to 5% of sulfur and from about 0.001% to 2% by weight of nitrogen.

The invention may perhaps be better understood with reference to the following example, which is intended to be illustrative and not limiting in scope.

*Example*

This example illustrates the results obtainable in a typical operation of the process described in FIGURE 1, using as feed a 350–630° F. boiling range straight-run gas oil containing 0.636% of sulfur and 0.03% of nitrogen by weight, having an API gravity of 36.5°, and containing 26 volume-percent aromatics. The hydrofining catalyst is composed of about 4% cobalt sulfide plus 16% of molybdenum sulfide impregnated on a silica-stabilized (5% $SiO_2$) activated alumina support. The hydrogenation catalyst in zone 10 is a 0.4% platinum-on-alumina reforming catalyst in the form ⅛-inch diameter extruded pellets. The operating conditions are as follows:

TABLE 1

| Operating Conditions | Hydrofining [a] Catalyst Bed 9 | Hydrogenation Catalyst Bed 10 |
| --- | --- | --- |
| LHSV | 0.5 | 1.0 |
| Pressure, p.s.i.g. | 600 | 600 |
| Temperature, ° F. | 750 | 550 |
| $H_2$/oil ratio, s.c.f./b.[b] | 760 | 2,340 |

[a] Hydrofining conditions correlated to reduce sulfur content to 0.015–0.02%.
[b] Based on fresh feed.

On the basis of an operation with total recycle of the 350° F.+ bottoms from fractionating column 64 to the bottom of hydrogenation catalyst bed 10, the approximate yields are as follows:

TABLE 2

| | |
| --- | --- |
| Liquid yield, vol. percent of feed | 102 |
| Disappearance of aromatics, vol. percent | 80 |
| Disappearance of sulfur, wt. percent | 99.9 |
| Total hydrogen consumption, s.c.f./b. | 600 |
| Product distribution, vol. percent: | |
| 350° end-point gasoline | 6.5 |
| 350–500° F. jet fuel | 61 |
| 500–605° F. diesel stock | 30 |
| 605° F.+ botts | 2 |

| Product Quality | Jet fuel | Diesel stock |
| --- | --- | --- |
| Vol. percent aromatics | 4 | 7 |
| Cetane index | 48.5 | 62 |
| CFR Luminometer No. | 68 | 62 |
| Smoke point, mm. | 28.2 | 26 |
| Wt. percent sulfur, p.p.m. | 8 | 6 |
| Wt. percent nitrogen, p.p.m. | 4 | 2 |

Results analogous to those indicated in the foregoing example are obtained when other hydrogenation catalysts and conditions, other feedstocks and other hydrofining conditions within the broad purview of the above disclosure are employed. It is hence not intended to limit the invention to the details of the example or the drawings, but only broadly as defined in the following claims.

We claim:

1. A process for converting a hydrocarbon feedstock boiling above the gasoline range, and containing aromatic hydrocarbons and organic sulfur compounds, to a substantially sulfur-free product oil of reduced aromaticity, which comprises:
   (A) subjecting said feedstock to catalytic hydrofining in concurrent flow with hydrogen at temperatures between about 600° and 850° F., and under space velocity conditions adjusted to give an incomplete desulfurization and refining of said feedstock;
   (B) cooling and partially condensing the effluent from said hydrofining and then separating the same into a liquid phase and a vapor phase;
   (C) stripping the separated liquid phase effluent from said hydrofining to remove dissolved hydrogen sulfide;
   (D) passing said stripped liquid phase from step (C) downwardly in a hydrogenation zone through a bed of granular hydrogenation catalyst comprising a Group VIII noble metal, in counter-current contact with a rising hydrogen stream and at a hydrogenation temperature and pressure correlated to maintain the major portion of feed in the liquid phase, and controlling the hydrogen/oil ratio therein so as to provide (a) between about 200 and 12,000 s.c.f. of hydrogen per barrel of feed, and (b) a sulfur/hydrogen input ratio thereto of between about 1 and 80 gms. per 1,000 s.c.f. of hydrogen;
   (E) recovering from said hydrogenation zone an overhead vapor phase effluent comprising hydrogen and a small proportion of low-boiling hydrocarbons; and
   (F) recovering a substantially sulfur-free oil of reduced aromaticity from the bottom of said hydrogenation zone.

2. A process as defined in claim 1 wherein said liquid phase hydrofiner effluent in step (C) is stripped with the vapor phase effluent from step (E).

3. A process as defined in claim 1 wherein said liquid-phase hydrofiner effluent in step (C) is stripped with an aqueous caustic solution.

4. A process as defined in claim 1, including the further steps of:
   (G) combining the vapor phase effluents from steps (B) and (D);
   (H) condensing and separating the combined vapor phases to give a recycle hydrogen stream and a liquid hydrocarbon condensate;
   (I) fractionating said liquid condensate to separate hydrocarbons boiling in and below the gasoline range, and to recover an intermediate boiling range, incompletely hydrogenated light recycle oil; and
   (J) recycling said light recycle oil to said countercurrent hydrogenation step (D).

5. A process as defined in claim 4 wherein said light recycle oil is recycled to the top of said hydrogenation catalyst bed used in step (D).

6. A process as defined in claim 4 wherein said light recycle oil is introduced in vapor phase at the bottom of said hydrogenation catalyst bed used in step (D), along with said rising hydrogen stream.

7. A process as defined in claim 4 wherein a portion of said recycle hydrogen stream is recycled without purification to said hydrofining step, and wherein another portion of said recycle stream is treated to remove hydrogen sulfide and is then recycled, along with total fresh makeup hydrogen required in the process, to the bottom of said hydrogenation zone.

8. A process for converting a hydrocarbon feedstock boiling between about 350° and 700° F., and containing aromatic hydrocarbons and organic sulfur compounds, to a substantially sulfur-free product oil of reduced aromaticity, which comprises:

(A) subjecting said feedstock to catalytic hydrofining in concurrent flow with hydrogen at temperatures between about 600° and 850° F., and under space velocity conditions adjusted to give an incomplete desulfurization and refining of said feedstock;

(B) cooling and partially condensing the effluent from said hydrofining and then separating the same into a liquid phase and a vapor phase;

(C) stripping the separated liquid phase effluent from said hydrofining with the vapor phase effluent from the hereinafter defined countercurrent hydrogenation step (D), said stripping being carried out at temperatures and pressures not substantially lower than the temperature and pressure prevailing in said countercurrent hydrogenation step, thereby producing a vapor phase stripping effluent and a stripped liquid phase;

(D) passing said stripped liquid phase from step (C) downwardly in a hydrogenation zone through a bed of granular hydrogenation catalyst comprising a Group VIII noble metal in countercurrent contact with a rising hydrogen stream at a hydrogenation temperature below about 650° F. and controlling the hydrogen/oil ratio therein so as to provide (a) between about 200 and 12,000 s.c.f. of hydrogen per barrel of feed, and (b) a sulfur/hydrogen input ratio thereto of between about 1 and 80 gms. per 1,000 s.c.f. of hydrogen, and recovering from said hydrogenation zone an overhead vapor phase effluent comprising hydrogen, a small proportion of low-boiling hydrocarbons, and a small proportion of hydrogen sulfide formed by the decomposition of sulfur compounds remaining from said incomplete hydrofining step (A);

(E) blending said vapor phase stripping effluent and said vapor phase hydrofining effluent and cooling and condensing the resulting mixture;

(F) separating the condensed mixture into a hydrogen recycle stream and a liquid hydrocarbon condensate;

(G) recycling at least a part of said hydrogen recycle stream to said catalytic hydrofining step (A); and (H) recovering a substantially sulfur-free product oil of reduced aromaticity from the bottom of said hydrogenation zone.

9. A process as defined in claim 8 wherein a portion of said recycle hydrogen stream is recycled without purification to said hydrofining step, and wherein another portion of said recycle stream is treated to remove hydrogen sulfide and is then recycled, along with total fresh makeup hydrogen required in the process, to the bottom of said hydrogenation zone.

10. A process as defined in claim 8 wherein a portion of said recycle hydrogen stream from step (F) is recycled without purification to said hydrofining step, and wherein another portion of said recycle stream is treated to remove hydrogen sulfide and is then recycled, along with total fresh makeup hydrogen required in the process, to the bottom of said hydrogenation zone.

11. A process as defined in claim 8, including the further steps of:

(I) fractionating said liquid condensate from step (F) to separate hydrocarbons boiling in and below the gasoline range, and to recover an intermediate-boiling-range incompletely hydrogenated light recycle oil; and (J) recycling said light recycle oil to said countercurrent hydrogenation step (D).

12. A process as defined in claim 11 wherein said light recycle oil is recycled to the top of said hydrogenation catalyst bed used in step (D).

13. A process as defined in claim 11 wherein said light recycle oil is introduced in vapor phase at the bottom of said hydrogenation catalyst bed used in step (D), along with said rising hydrogen stream.

14. A process as defined in claim 11 wherein said light recycle oil is recycled to an intermediate point in said hydrogenation catalyst bed used in step (D).

15. A process for hydrogenating an aromatic hydrocarbon feedstock containing organic sulfur compounds and boiling between about 400° and 700° F., which comprises subjecting said feedstock to a limited catalytic hydrofining to reduce the organic sulfur content to a level sufficient to provide a sulfur/hydrogen input ratio to the hereinafter defined hydrogenation step of between about 1 and 80 gms. per 1,000 s.c.f., then passing the partially hydrofined liquid effluent downwardly through a hydrogenation zone containing a bed of granular hydrogenation catalyst comprising a Group VIII noble metal at hydrogenation temperatures below about 650° F. and pressures between about 200 and 3,000 p.s.i.g., while flowing a stream of initially hydrogen sulfide-free hydrogen upwardly through said hydrogenation catalyst bed in countercurrent contact with said downflowing liquid hydrofiner effluent, and controlling the hydrogen/oil ratio in said hydrogenation zone so as to provide (a) between about 200 and 12,000 s.c.f. of hydrogen per barrel of feed, and (b) a sulfur/hydrogen input ratio thereto of between about 1 and 80 gms. per 1,000 s.c.f. of hydrogen, recovering a vapor phase mixture of hydrogen and light hydrocarbons from the top of said hydrogenation catalyst bed, and recovering a desired relatively non-aromatic liquid hydrocarbon fraction from the bottom of said hydrogenation catalyst bed.

16. A process as defined in claim 15 where said hydrogenation catalyst is selected from the class consisting of platinum and palladium deposited upon an activated alumina carrier.

References Cited in the file of this patent
UNITED STATES PATENTS

| | | |
|---|---|---|
| 2,671,754 | De Rosset et al. | Mar. 9, 1954 |
| 2,952,625 | Kelly et al. | Sept. 13, 1960 |
| 2,952,626 | Kelly et al. | Sept. 13, 1960 |
| 3,003,953 | Evans | Oct. 10, 1961 |
| 3,072,564 | Stewart | Jan. 8, 1963 |